(12) United States Patent
Condict et al.

(10) Patent No.: US 9,424,285 B1
(45) Date of Patent: Aug. 23, 2016

(54) CONTENT-BASED SAMPLING FOR DEDUPLICATION ESTIMATION

(71) Applicant: NetApp, Inc., Sunnyvale, CA (US)

(72) Inventors: Michael N. Condict, Hurdle Mills, NC (US); Fei Xie, Raleigh, NC (US); Kishore Kasi Udayashankar, San Mateo, CA (US)

(73) Assignee: NETAPP, INC., Sunnyvale, CA (US)

( * ) Notice: Subject to any disclaimer, the term of this patent is extended or adjusted under 35 U.S.C. 154(b) by 201 days.

(21) Appl. No.: 13/712,639

(22) Filed: Dec. 12, 2012

(51) Int. Cl.
*G06F 17/30* (2006.01)

(52) U.S. Cl.
CPC .... *G06F 17/30303* (2013.01); *G06F 17/30156* (2013.01)

(58) Field of Classification Search
CPC .............................................. G06F 17/30156
USPC .......................................... 707/637, 692, 693
See application file for complete search history.

(56) References Cited

U.S. PATENT DOCUMENTS

| 8,180,740 | B1 * | 5/2012 | Stager et al. ................. 707/692 |
| 8,483,423 | B2 * | 7/2013 | Malik et al. ................... 382/100 |
| 8,615,499 | B2 * | 12/2013 | Chambliss ........ G06F 17/30156 707/693 |
| 8,626,723 | B2 * | 1/2014 | Ben-Shaul et al. ........... 707/692 |
| 8,650,163 | B1 * | 2/2014 | Harnik .................. G06F 3/0605 707/692 |
| 8,712,963 | B1 * | 4/2014 | Douglis et al. ................ 707/637 |
| 2004/0260930 | A1 * | 12/2004 | Malik et al. .................... 713/176 |
| 2007/0033163 | A1 * | 2/2007 | Epstein et al. ..................... 707/3 |
| 2009/0049260 | A1 * | 2/2009 | Upadhyayula ................ 711/162 |
| 2010/0094817 | A1 * | 4/2010 | Ben-Shaul et al. ........... 707/697 |
| 2010/0114833 | A1 * | 5/2010 | Mu ............................... 707/650 |
| 2012/0072396 | A1 * | 3/2012 | Mu ............................... 707/650 |
| 2012/0303595 | A1 * | 11/2012 | Liu et al. ....................... 707/692 |
| 2013/0198148 | A1 * | 8/2013 | Chambliss ........ G06F 17/30156 707/692 |
| 2013/0212074 | A1 * | 8/2013 | Romanski et al. ............ 707/692 |
| 2014/0114934 | A1 * | 4/2014 | Chakraborty et al. ........ 707/692 |

OTHER PUBLICATIONS

Harnik, Danny et al., "Estimation of Deduplication Ratios in Large Data Set," Mass Storage Systems and Technologies (MSST) 2012 IEEE 28th Symposium, 11 pgs.
Charikar, Moses et al., "Towards Estimation Error Guarantees for Distinct Values," PODS '00 Proceedings of the 19th ACM SIGMOD—SIGACT—SIGART Symposium, New York, New York, 12 pgs.

\* cited by examiner

*Primary Examiner* — Jean M Corrielus
(74) *Attorney, Agent, or Firm* — Cooper Legal Group, LLC

(57) ABSTRACT

The techniques introduced herein provide for systems and methods for estimating the effectiveness of utilizing a data deduplication process. More specifically, a content-based sampling approach for data deduplication estimation is described in which a subset of the scanned fingerprints of a dataset are included in a content-based sample that is used to determine an accurate deduplication estimate for a dataset (or volume).

28 Claims, 12 Drawing Sheets

CONTENT-BASED SAMPLING FOR DEDUPLICATION ESTIMATION

FIELD OF THE INVENTION

At least one embodiment of the present invention pertains to data storage systems, and more particularly to, data deduplication estimation using a content-based sampling technique.

BACKGROUND

A network storage controller is a processing system that is used to store and retrieve data on behalf of one or more hosts on a network. A storage controller operates on behalf of one or more hosts to store and manage data in a set of mass storage devices, such as magnetic or optical storage-based disks or tapes. Some storage controllers are designed to service file-level requests from hosts, as is commonly the case with file servers used in network attached storage (NAS) environments. Other storage controllers are designed to service block-level requests from hosts, as with storage controllers used in a storage area network (SAN) environment. Still other storage controllers are capable of servicing both file-level requests and block-level requests, as is the case with certain storage controllers made by NetApp, Inc. of Sunnyvale, Calif.

One function commonly employed by storage controllers is data deduplication. Data deduplication eliminates redundant data to improve storage space utilization. For example, in the deduplication process, duplicate data blocks (i.e., data blocks having the same data at different locations on a logical storage device) are deleted from a logical storage device. In a scenario of perfect deduplication, only one instance of each distinct (or unique) data block is stored. Each subsequent instance simply contains a reference to the one saved unique instance of the data block, and thus the illusion is presented to clients that the duplicate copies are still present at their respective locations.

The data deduplication process is able to reduce the required storage capacity by reducing the amount of data (i.e., number of data blocks) that is stored. Reducing the amount of data that is stored requires less physical storage resources, which can reduce overall system cost. However, the benefit of data deduplication can vary depending on a given workload. For example, the data deduplication function may be turned off for certain workloads that do not have a high level of duplication to avoid degradation of input/output (I/O) performance and to avoid metadata overhead.

Accordingly, determining whether to use data deduplication may involve making a determination (or estimate) with respect to the benefit of the data deduplication for a given workload or dataset. Unfortunately, existing deduplication estimations are either not fast enough or not accurate enough. Currently, the simplest way to discover the benefit of data deduplication is to turn on or activate the data deduplication features. If the benefit is not satisfactory, the data deduplication process can be reverted. However, this naïve approach is very time consuming due to the overhead of deduplication.

Various alternative approaches to estimate the potential benefit of data deduplication suffer from low accuracy. For example, one approach to estimate the potential benefit of data deduplication based on the type of workload has low accuracy. Similarly, random sampling based estimations (i.e., based on a random sample of a dataset or volume) have also proven to have low accuracy. This is primarily because, for any random-sampling-based estimation function, there are frequency distributions that cause it to be very inaccurate, unless the sample percentage is very large (e.g., greater than 50% of the dataset size).

Therefore, the problems of computational complexity and latency and poor accuracy when estimating the effectiveness of utilizing a deduplication process pose a significant challenge in determining whether to apply deduplication in a given context.

SUMMARY

The techniques introduced herein provide for systems and methods for estimating the effectiveness of utilizing a data deduplication process. More specifically, a content-based sampling approach for data deduplication estimation is described in which a subset of the scanned fingerprints of a dataset are included in a content-based sample that is used to determine an accurate deduplication estimate for a dataset (or volume).

The deduplication estimate overcomes speed issues of the prior art because only a subset (or fraction) of all of the fingerprints of the dataset are used in the estimation. Further, the deduplication estimate is accurate because the fingerprints included in the subset can be selected by an adaptive filter that selects the content-based sample independent of frequency distribution.

Other aspects of the techniques summarized above will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The following detailed description is described with reference to a storage system environment; however, it is appreciated that the systems and methods, and/or data structures described herein are equally applicable to any data processing system that can benefit through the utilization of a data deduplication process.

I. Overview

A. System Architecture

Figure 1:
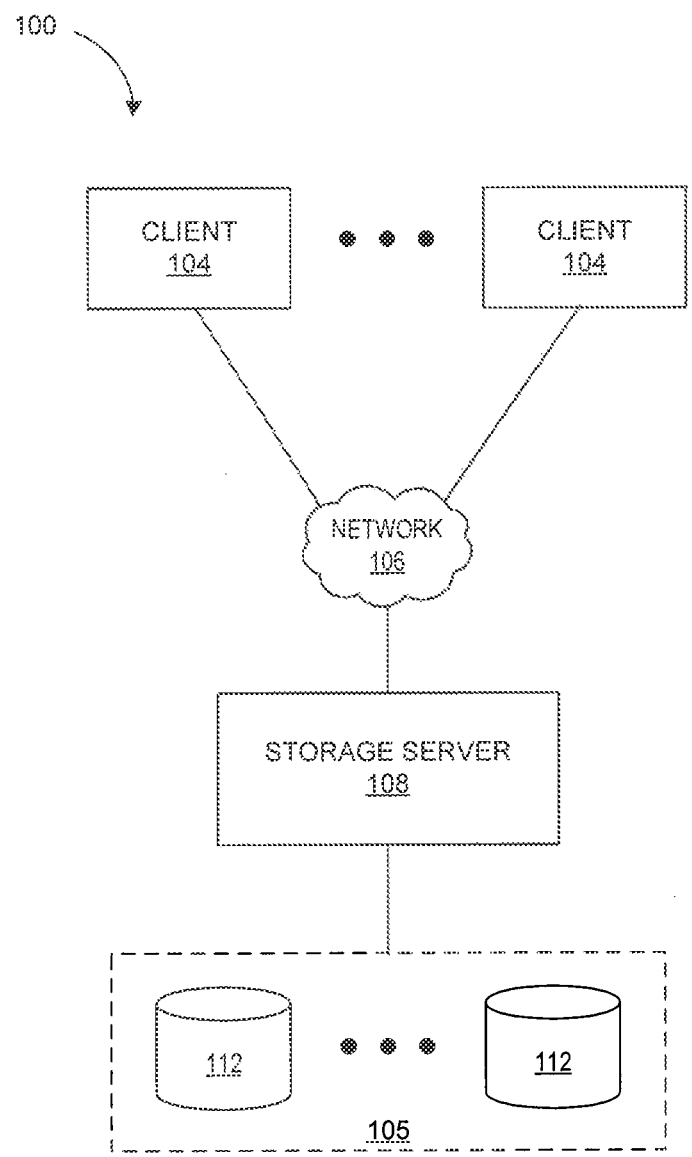
FIG. 1 shows an example of a network storage system.

FIG. 1 shows an example network storage system 100 (or configuration) in which the techniques introduced herein can be implemented. The network configuration described with respect to FIG. 1 is for illustration of one type of configuration in which the techniques can be implemented; other network storage configurations and/or schemes could be used for implementing the techniques introduced herein.

As shown in the example of FIG. 1, the network storage system 100 includes a plurality of client systems 104, a storage server 108, and a network 106 connecting the client systems 104 and the storage server 108. The storage server 108 is coupled with a number of mass storage devices (or storage containers) 112, such as disks, in a mass storage subsystem 105. Alternatively or additionally, some or all of the mass storage devices 112 can be other types of storage, such as flash memory, solid-state drives (SSDs), tape storage, etc. However, for ease of description, the storage devices 112 are assumed to be disks herein.

The storage server 108 can be, for example, one of the FAS-series of storage server products available from NetApp®, Inc. The client systems 104 are connected to the storage server 108 via the network 106, which can be a packet-switched network, for example, a local area network (LAN) or wide area network (WAN). Further, the storage server 108 can be connected to the disks 112 via a switching fabric (not shown), which can be a fiber distributed data interface (FDDI) network, for example. It is noted that, within the network data storage environment, any other suitable number of storage servers and/or mass storage devices, and/ or any other suitable network technologies, may be employed.

The storage server 108 can make some or all of the storage space on the disk(s) 112 available to the client systems 104 in a conventional manner. For example, each of the disks 112 can be implemented as an individual disk, multiple disks (e.g., a RAID group) or any other suitable mass storage device(s) including combinations and/or variations thereof. Storage of information in the mass storage subsystem 105 can be implemented as one or more storage volumes that comprise a collection of physical storage disks 112 cooperating to define an overall logical arrangement of volume block number (VBN) space on the volume(s). Each logical volume is generally, although not necessarily, associated with its own file system.

The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used according to the techniques described herein. One or more RAID groups together form an aggregate. An aggregate can contain one or more volumes.

The storage server 108 can receive and respond to various read and write requests from the client systems 104, directed to data stored in or to be stored in the storage subsystem 105.

Although the storage server 108 is illustrated as a single unit in FIG. 1, it can have a distributed architecture. For example, the storage server 108 can be designed as a physically separate network module (e.g., "N-blade") and disk module (e.g., "D-blade") (not shown), which communicate with each other over a physical interconnect. Such an architecture allows convenient scaling, such as by deploying two or more N-blades and D-blades, all capable of communicating with each other through the interconnect.

Further, a storage server 108 can be configured to implement one or more virtual storage servers. Virtual storage servers allow the sharing of the underlying physical storage controller resources, (e.g., processors and memory, between virtual storage servers while allowing each virtual storage server to run its own operating system) thereby providing functional isolation. With this configuration, multiple server operating systems that previously ran on individual machines, (e.g., to avoid interference) are able to run on the same physical machine because of the functional isolation provided by a virtual storage server implementation. This can be a more cost effective way of providing storage server solutions to multiple customers than providing separate physical server resources for each customer.

Figure 2:
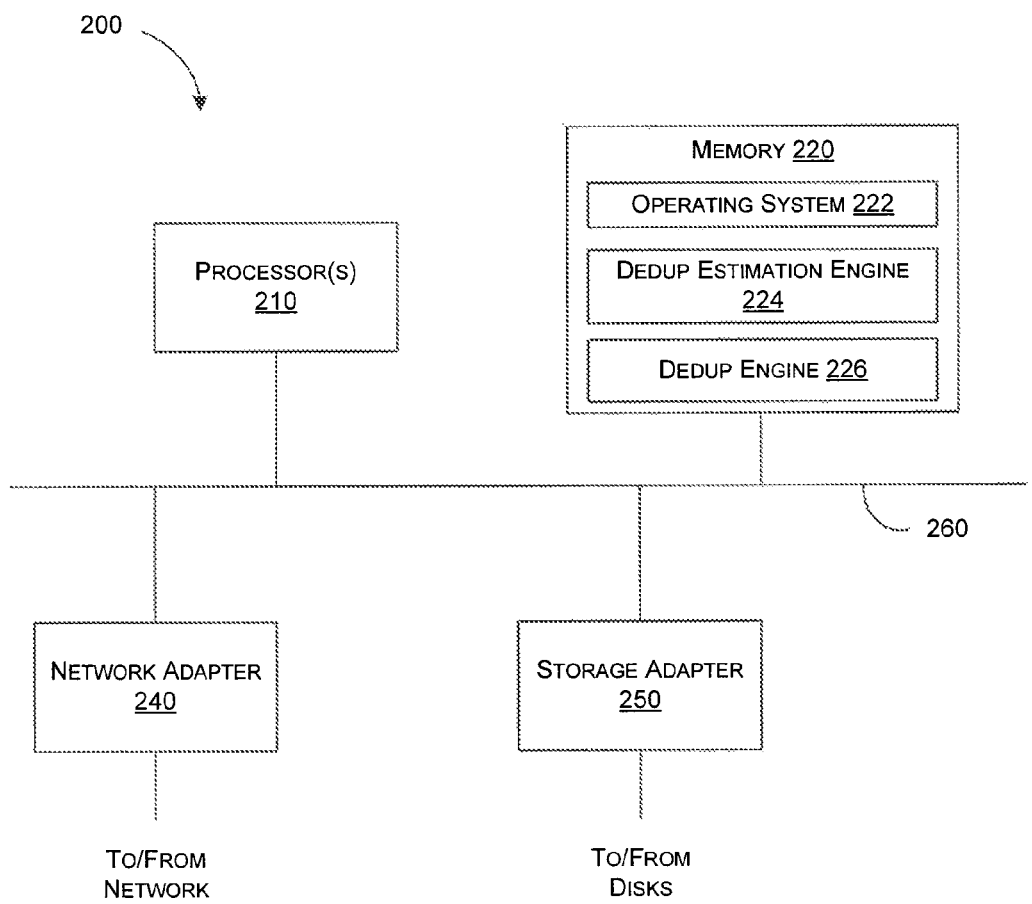
FIG. 2 is a diagram illustrating an example of a storage controller that can implement one or more network storage servers.

FIG. 2 is a diagram illustrating an example of the hardware architecture of a storage controller 200 that can implement one or more network storage servers, for example, storage server 108 of FIG. 1. The storage server is a processing system that provides storage services relating to the organization of information on storage devices, such as disks 112 of the mass storage subsystem 105. In an illustrative embodiment, the storage server 108 includes a processor subsystem 210 that includes one or more processors. The storage server 108 further includes a memory 220, a network adapter 240, and a storage adapter 250, all interconnected by an interconnect 260.

The storage server 108 can be embodied as a single- or multi-processor storage server executing a storage operating system 222 that preferably implements a high-level module, called a storage manager, to logically organize data as a hierarchical structure of named directories, files, and/or data "blocks" on the disks 112.

The memory 220 illustratively comprises storage locations that are addressable by the processor(s) 210 and adapters 240 and 250 for storing software program code and data associated with the techniques introduced here. For example, some of the storage locations of memory 220 can be used to store a data deduplication estimation engine 224, a sampled fingerprint database (not shown), and/or a data deduplication engine 226. The data deduplication estimation engine 224 estimates the number of distinct data blocks using a content-based sampling technique described herein. The deduplication engine 226 performs the deduplication. The storage operating system 222, portions of which are typically resident in memory and executed by the processing elements, functionally organizes the storage server 108 by (among other functions) invoking storage operations in support of the storage service provided by the storage server 108. It will be apparent to those skilled in the art that other processing and memory implementations, including various computer readable storage media, may be used for storing and executing program instructions pertaining to the techniques introduced here. Similar to the storage server 108, the storage operating system 222 can be distributed, with modules of the storage system running on separate physical resources.

The network adapter 240 includes a plurality of ports to couple the storage server 108 with one or more clients 104, or other storage servers, over point-to-point links, wide area networks, virtual private networks implemented over a public network (Internet) or a shared local area network. The network adapter 240 thus can include the mechanical components as well as the electrical and signaling circuitry needed to connect the storage server 108 to the network 106. Illustratively, the network 106 can be embodied as an Ethernet network or a Fibre Channel network. Each client 104 can communicate with the storage server 108 over the network 106 by exchanging packets or frames of data according to pre-defined protocols, such as Transmission Control Protocol/Internet Protocol (TCP/IP).

The storage adapter 250 cooperates with the storage operating system 222 to access information requested by the clients 104. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on disks 112. The storage adapter 250 includes a plurality of ports having input/output (I/O) interface circuitry that couples with the disks over an I/O interconnect arrangement, such as a conventional high-performance, Fibre Channel link topology.

The storage operating system 222 facilitates clients' access to data stored on the disks 112. In certain embodiments, the storage operating system 222 implements a write-anywhere file system that cooperates with one or more virtualization modules to "virtualize" the storage space provided by disks 112. In certain embodiments, a storage manager element of the storage operation system 222 such as, for example storage manager 310 of FIG. 3, logically organizes the information as a hierarchical structure of named directories and files on the disks 112. Each "on-disk" file may be implemented as a set of disk blocks configured to store information. As used herein, the term "file" means any logical container of data. The virtualization module(s) may allow the storage manager 310 to further logically organize information as a hierarchical structure of blocks on the disks that are exported as named logical units.

The interconnect 260 is an abstraction that represents any one or more separate physical buses, point-to-point connections, or both, connected by appropriate bridges, adapters, or controllers. The interconnect 260, therefore, may include, for example, a system bus, a form of Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire", and/or any other suitable form of physical connection.

Figure 3:
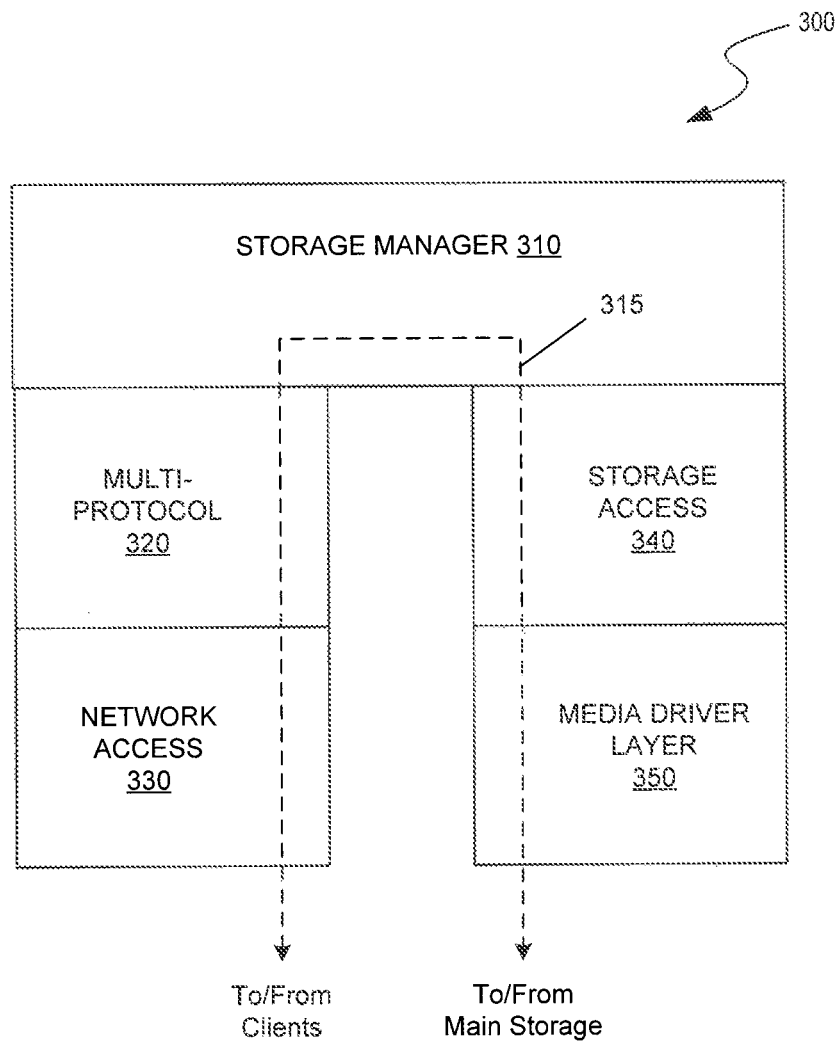
FIG. 3 schematically illustrates an example of the architecture of a storage operating system in a storage server.

FIG. 3 schematically illustrates an example of the architecture 300 of a storage operating system 222 for use in a storage server 108. In one embodiment, the storage operating system 222 can be the NetApp® Data ONTAP® operating system available from NetApp, Inc., Sunnyvale, Calif. that implements a Write Anywhere File Layout (WAFL®) file system. However, another storage operating system may alternatively be designed or enhanced for use in accordance with the techniques described herein.

The storage operating system 222 can be implemented as programmable circuitry programmed with software and/or firmware, or as specially designed non-programmable circuitry (i.e., hardware), or in a combination and/or variation thereof. In the illustrated embodiment, the storage operating system 222 includes several modules, or layers. These layers include a storage manager 310, which is the core functional element of the storage operating system 222. The storage manager 310 imposes a structure (e.g., one or more file systems) on the data managed by the storage server 108 and services read and write requests from clients 104.

To allow the storage server to communicate over the network 106 (e.g., with clients 104), the storage operating system 222 also includes a multi-protocol layer 320 and a network access layer 330, logically under the storage manager 310. The multi-protocol layer 320 implements various higher-level network protocols, such as Network File System (NFS), Common Internet File System (CIFS), Hypertext Transfer Protocol (HTTP), and/or Internet small computer system interface (iSCSI), to make data stored on the disks 112 available to users and/or application programs. The network access layer 330 includes one or more network drivers that implement one or more lower-level protocols to communicate over the network, such as Ethernet, Internet Protocol (IP), TCP/IP, Fibre Channel Protocol and/or User Datagram Protocol/Internet Protocol (UDP/IP).

Also, to allow the device to communicate with a storage subsystem (e.g., storage subsystem 105), the storage operating system 222 includes a storage access layer 340 and an associated storage driver layer 350 logically under the storage manager 310. The storage access layer 340 implements a higher-level storage redundancy algorithm, such as RAID-4, RAID-5 or RAID DP®. The storage driver layer 350 implements a lower-level storage device access protocol, such as Fibre Channel Protocol or small computer system interface (SCSI).

Also shown in FIG. 3 is the path 315 of data flow through the storage operating system 222, associated with a read or write operation, from the client interface to the storage interface. Thus, the storage manager 310 accesses the storage subsystem 105 through the storage access layer 340 and the storage driver layer 350. Clients 104 can interact with the storage server 108 in accordance with a client/server model of information delivery. That is, the client 104 requests the services of the storage server 108, and the storage server may return the results of the services requested by the client, by exchanging packets over the network 106. The clients may issue packets including file-based access protocols, such as CIFS or NFS, over TCP/IP when accessing information in the form of files and directories. Alternatively, the clients may issue packets including block-based access protocols, such as iSCSI and SCSI, when accessing information in the form of blocks.

B. File System Structure

It is useful now to consider how data can be structured and organized in a file system by storage controllers such as, for example, storage server 108 of FIG. 1, according to certain embodiments. The term "file system" is used herein only to facilitate description and does not imply that the stored data must be stored in the form of "files" in a traditional sense; that is, a "file system" as the term is used herein can store data in the form of blocks, logical units (LUNs) and/or any other type(s) of units.

In at least one embodiment, data is stored in volumes. A "volume" is a logical container of stored data associated with a collection of mass storage devices, such as disks, which obtains its storage from (i.e., is contained within) an aggregate, and which is managed as an independent administrative unit, such as a complete file system. Each volume can contain data in the form of one or more directories, subdirectories, qtrees, files and/or files. An "aggregate" is a pool of storage, which combines one or more physical mass storage devices (e.g., disks) or parts thereof into a single logical storage object. An aggregate contains or provides storage for one or more other logical data sets at a higher level of abstraction, such as volumes.

II. Deduplication Estimation

Figure 4:
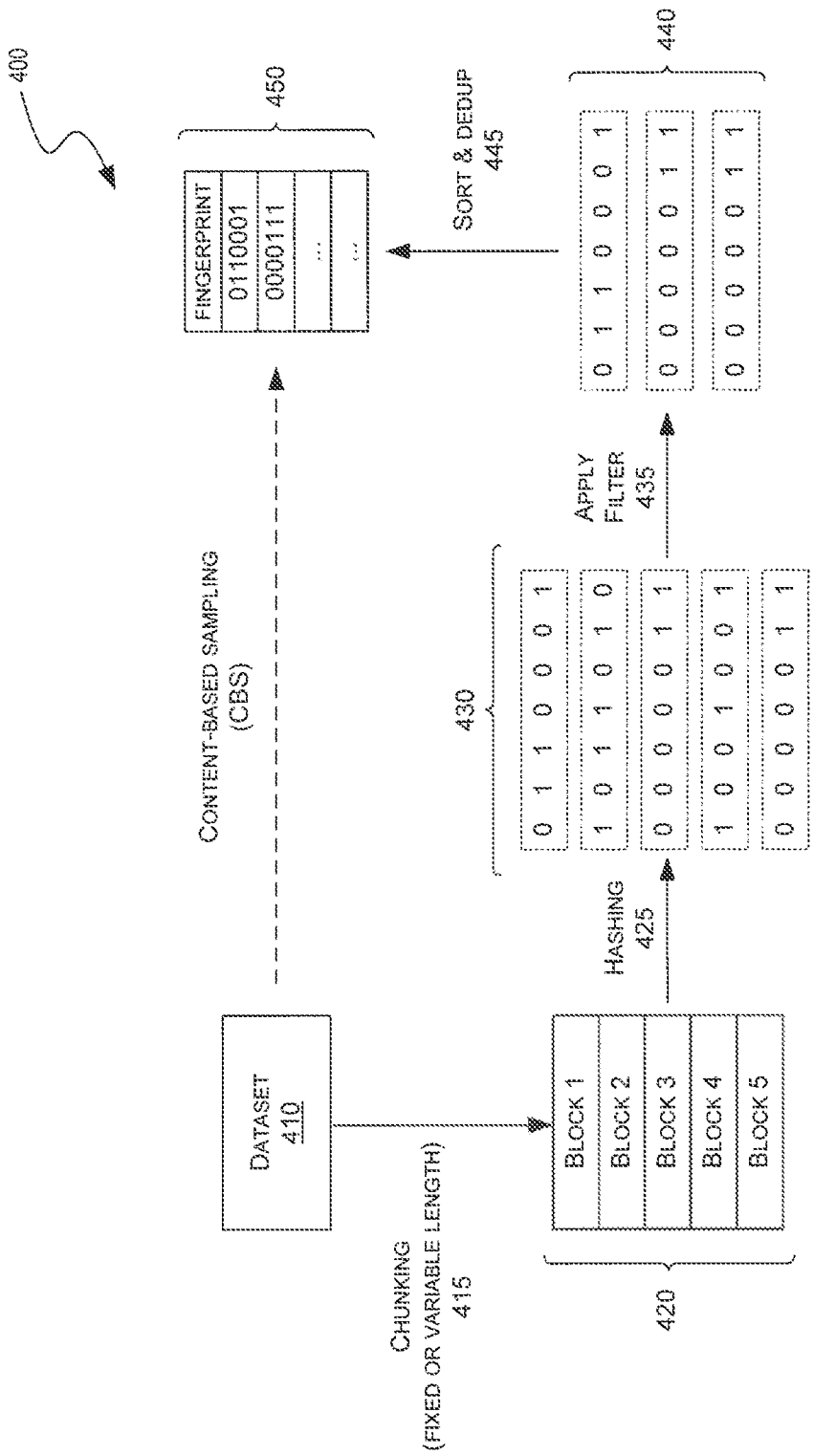
FIG. 4 shows an example diagram illustrating a scheme for performing content-based sampling in order to estimate the number of distinct data blocks in a dataset.

FIG. 4 shows an example of a scheme 400 for performing content-based sampling in order to estimate the number of distinct data blocks in a dataset 410, according to an embodiment. More specifically, in the example of FIG. 4 a content-based sampling approach is performed by a data processing system such as, for example, storage controller 200 of FIG. 2 for deduplication estimation.

In the example of FIG. 4, a deduplication estimation technique is applied in which all data blocks (or fingerprints associated with those blocks) are scanned, but only a small number are included in the content-based sample that is used to estimate the number of distinct data blocks in the dataset 410. Advantageously, this approach uses less metadata than full deduplication because it involves only a subset of the block fingerprints. The decreased size of the metadata results in less CPU time. Additionally, in one or more embodiments, no or limited I/O is necessary for sorting the metadata because the entire subset can be stored in memory.

The data processing system 400 first performs a chunking operation 415 on the dataset 410 in order to divide and/or otherwise segment the dataset 410 into blocks 420. Typically, a file system (not shown) performs the chunking operation 415. The dataset 410 may be the data stored on a storage container (e.g., a volume). A file system may perform fixed length chunking and/or variable length chunking. The chunking operation 415 results in a plurality of data blocks 420.

The data processing system 400 subsequently performs a hash function 425 on each of the data blocks 420 to generate fingerprints (hash values) 430. A fingerprint is fixed-length, pseudorandom sequence of bits that is a product of the hash function 425. The fingerprints 430 can be viewed as and/or converted to integer values. When viewed as an integer values, the fingerprints 430 are close to being uniformly randomly distributed across a known integer range (i.e., $0 \ldots 2^n$, where n is the number of bits in the fingerprint). Accordingly, each fingerprint 430 uniquely identifies one of a plurality of data blocks 420 included in the dataset 410. Because of this randomness, and because most fingerprints will contain at least 32 bits, it is expected that only an insignificant percentage of distinct data block values will have the same fingerprint. This means that the size of the set of distinct fingerprints is approximately the same as the size of the set of distinct data blocks. Thus, the problem of estimating the number of distinct data blocks in a storage container can be solved by estimating the number of distinct fingerprints in the storage container. Because of the relatively small size of a fingerprint compared to the size of the data block (e.g., typically 4 KB), much less computational resources are required.

The fingerprints 430 can be generated and/or stored by other modules and/or operations (not shown) of the data processing system 400. For example, in one embodiment, a 32-bit RAID checksum is used as a fingerprint. Alternatively or additionally, one or more modules of the data processing system 400 may maintain a fingerprint database. In either case, prior to use, each of the fingerprints must be scanned and/or otherwise read by the data processing system 400. The various scanning techniques are discussed in greater detail with respect to FIGS. 6 and 9.

The data processing system 400 applies a filter operation 435 (or sample function) to the fingerprints 430 to select and/or otherwise identify a content-based sample of the fingerprints 440. Advantageously, the content-based sample 440 is not selected randomly, but rather by scanning all of the block fingerprints 430 in or associated with the dataset 410 and selecting only those fingerprints that satisfy some predicate on their value. This is why the sample is said to be content-based. Whether an individual fingerprint passes the filter operation 435 is based on the content (or value) of that fingerprint.

The content-based sample 440 is selected and/or otherwise filtered to contain the fingerprints 430 whose integer value $f$ satisfies a specific sampling condition (or function). In one embodiment, the sampling function (or condition) comprises the function $(f \bmod M)=0$.

In general, the filtering mechanism should satisfy two requirements to produce an accurate data deduplication estimate. First, the probability of any particular fingerprint (integer value) being selected in the sample is independent of the number of times that the fingerprint occurs in a dataset 410 (or storage container). This is because the fingerprint is a uniform pseudo-random number computed from the data block (i.e., content) and the most frequently occurring data blocks are no more or less likely to have a fingerprint that satisfies the sampling condition (e.g., $(f \bmod M)=0$). Second, the probability of an fingerprint (integer value) being in the sample is $1/M$ of random, since only $1/M$ of randomly selected integers $f$ have the property that $(f \bmod M)=0$.

The sampling condition $(f \bmod M)=0$ is just one example of many possible sampling conditions that could produce a content-based sample satisfying the above requirements. Any sampling condition that produces a predictable fraction of the fingerprints, independent of the frequency distribution, and based only on the value of the fingerprint (and constants like M), can be appropriate sampling conditions for the purposes of the content-based sampling techniques described herein. For example, the sampling condition $(f \bmod M)=n$, for any $0 \leq n < M$ will result in the same probabilistic properties as the sampling condition $(f \bmod M)=0$. In another example, the sampling condition $f<M$ or $f>M$, for some fixed M that is in the range of fingerprint (integer) values could also be utilized.

More precisely, given a fingerprinting scheme with a high degree of randomness, define F as the set of all possible fingerprint values $f$, and define $B=\{1,0\}$. For any function A that maps the set F to the set B, if the probability of $A(f)=1$, for any $f$, is a known fixed value p, $A(f)=1$ can be used as the sampling condition for content-based sampling. In this case, the number of distinct blocks is estimated as the number of distinct fingerprints in the sample divided by p. Likewise, $A(f)=0$ could be used as the sampling condition, in which case the number distinct blocks is estimated as the number of distinct fingerprints in the sample divided by $(1-p)$. In practice, the event with smaller probability is more likely to be selected as the sampling condition since as it will result in a smaller sample size.

The accuracy of the above described content-based sampling approach is related only to the size of the content-based sample. That is, the accuracy does not depend on the size of the dataset or the sample percentage. Generally, the larger the sample size, the smaller the error. However, in practice a sample of a few thousand fingerprints using the content-based sampling techniques described herein give adequate accuracy for most storage purposes.

Once the fingerprints have been filtered (or sampled), the data processing system 400 performs a sort and dedup operation 445 to sort the content-based sample of fingerprints 440 by their integer values and identify and remove duplicates. The result of the sort and dedup operation 445 is the number of distinct fingerprints (i.e., or data blocks) in the content-based sample of fingerprints 440. The number of distinct fingerprint (i.e., or data blocks) in the content-based sample of fingerprints 440 is then multiplied by M to estimate the number of distinct data blocks in the dataset 410.

Figure 5:
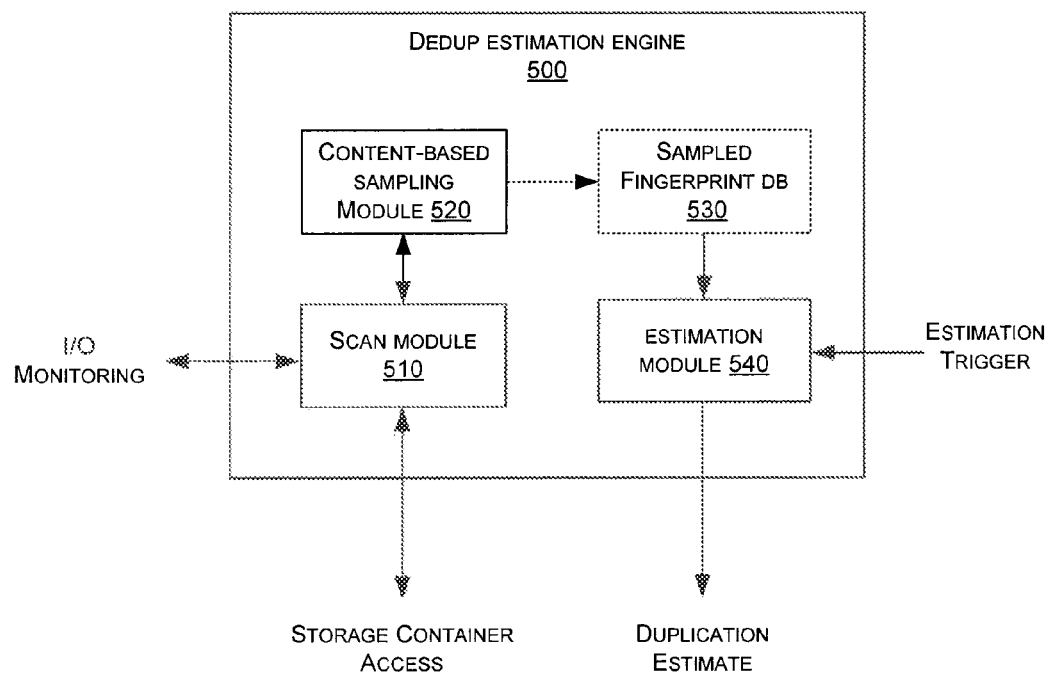
FIG. 5 shows an example block diagram illustrating the components of a data deduplication estimation engine.

FIG. 5 shows an example block diagram illustrating the components of a data deduplication estimation engine 500, according to an embodiment. The data deduplication estimation engine 500 may be, for example, the data deduplication estimation engine 224 of FIG. 2, although alternative configurations are possible. As shown in the example of FIG. 5, the data deduplication estimation engine 500 includes a scan module 510, a content-based sampling module 520, a sampled fingerprint database (FPDB) 530, and an estimation module 540. Additional or less modules can be included.

The data deduplication engine 500, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

The scan module 510 is configured to efficiently scan fingerprints in a dataset. The description is primarily directed to a WAFL file system, however, it is appreciated that the scanning techniques described herein are equally applicable to any storage system. The scan module 510 is configured to scan one or more storage devices and/or monitor I/O operations (e.g., writes to the storage devices). Monitoring the I/O operations means that the scan module 510 can add newly written data blocks to the sample FPDB 530 (if the fingerprints pass the content-based sampling module 520 filtering) and remove newly deleted data blocks if the removed data blocks are part of the sample FPDB 530.

In one embodiment, the scan module 510 scans existing data blocks of a dataset stored on a storage device and computes a fingerprint for each data block. Alternatively, pre-computed fingerprints stored with the dataset on the storage device or in memory on the storage system can be scanned by the scan module 510. For example, the scan module 510 could read and/or otherwise acquire a list of fingerprints for all of the live blocks of a dataset using any known technique.

In one embodiment, the scan module 510 scans I/O to maintain the sample FPDB 530. The scan module 510 can monitor data blocks that are written or removed in real-time or near real-time and pass these blocks on to the content-based sampling module 520 for a determination as to whether or not the sampled FPDB 530 should be modified. The real-time (or near real-time) monitoring can introduce additional overhead in some cases. Additionally, unnecessary latency can be introduced into the estimation process due to the non-intrusive disk scanning that is required. Accordingly, another solution is to scan and update the sample FPDB 530 periodically.

In one embodiment, the scan module 520 monitors and generates a change log file indicating data blocks that have been written since the last time that the sample FPBD 530 was updated. Accordingly, the sampled fingerprint database 530 indicates the new data blocks that pass the filter (i.e., the content-based sampling module 520). However, the sampled fingerprint database 530 cannot indicate which, if any, blocks are overwritten. For example, if block A overwrites block B in the same location in memory, and block B previously passed the content-based sampling module 520 (e.g., the filter), but block A does not pass the content-based sampling module 520, then A is not included in the sampled fingerprint database 530. To determine that block B is overwritten, a stale block checking process, described below, is performed.

In another embodiment, the scan module 520 can take advantage of, reuse, and/or otherwise utilize a change log file that is generated by another module within the storage system such as, for example, the data deduplication engine. For example, the data deduplication engine can generate a change log file that indicates which data blocks have been written or removed since the last consistency point (CP). A CP is an event in which new or modified data that have been temporarily buffered in a storage server are committed to persistent storage. Various examples describing the use of the change log files in greater detail are discussed with respect to FIGS. 9-11.

The content-based sampling module 520 is configured to receive the scanned fingerprints and apply a sampling condition (or filter) to the fingerprints to determine whether or not they should be added to the sampled FPBD 530. As discussed above, the sampling (or filtering) mechanism must satisfy two requirements to produce an accurate data deduplication estimate. First, the probability of any particular fingerprint (integer value) being selected in the sample is independent of the number of times that the fingerprint occurs in a dataset (or storage container). This is because the fingerprint is a uniform pseudo-random number computed from the data block (i.e., content) and the most frequently occurring data blocks are no more or less likely to have a fingerprint that satisfies the sampling condition (e.g., ($f$ mod M)=0). Second, the probability of an fingerprint (integer value) being in the sample is 1/M of random, since only 1/M of randomly selected integers $f$ have the property that ($f$ mod M)=0.

One challenge with determining the appropriate sampling condition is selecting an integer M prior to the scanning that results in a subset with enough distinct values in the sample that results in the desired accuracy. For example, the integer M could be computed from the number of distinct values in the data set (or storage container); however, this is what the dedup estimation engine 500, in part, is attempting to estimate. Accordingly, in one embodiment the content-based sampling module 520 provides for adaptive filtering that increases the restrictiveness of the sampling condition (or filter) over the scan of the fingerprints so that an appropriate number of distinct values are included in the sample and the fingerprints only need to be scanned once. The adaptive filtering or sampling mechanisms are discussed in greater detail with respect to FIG. 8.

The content-based sampling module 520 can performs a sort and dedup operation on the fingerprints that pass the sampling condition. In some embodiments, a reference counter may also be kept to keep track of the number of instances of any fingerprint. The result of the sort and dedup operation is the content-based sample of fingerprints (i.e., the sampled FPDB 530).

The estimation module 540 is configured to estimate the number of distinct data blocks in the data set. The estimation module 540 first determines the number of distinct fingerprints (i.e., or data blocks) in the content-based sample of fingerprints. The number of distinct fingerprint (i.e., or data blocks) in the content-based sample of fingerprints is then multiplied by M to estimate the number of distinct data blocks in the dataset. The estimation module 540 can also perform other operations. For example, the estimation module 540 can determine a distinct block ratio by dividing the estimated number of distinct data blocks by a total number of data blocks where the total number of blocks scanned for the dataset is provided by the scan module 510 or the content-based sampling module 520.

Figure 6:
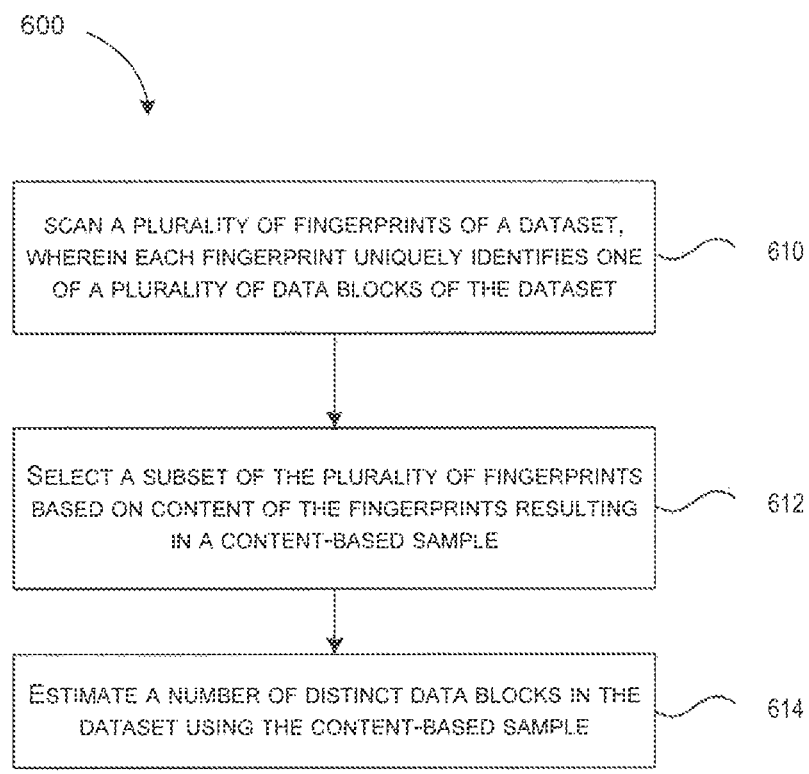
FIG. 6 is a flow diagram illustrating an example process for estimating the number of distinct data blocks in a dataset.

FIG. 6 is a flow diagram illustrating an example process 600 for estimating the number of distinct data blocks in a dataset, according to an embodiment. A deduplication estimation engine such as data deduplication engine 224 of FIG. 2, among other functions, determines an estimate of the number of distinct data blocks in a dataset. The deduplication estimation engine may be embodied as hardware and/or software, including combinations and/or variation thereof. In addition, in some embodiments, the deduplication estimation engine includes instructions stored thereon, wherein the instructions, when executed by one or more processors of a data processing system or storage controller such as storage controller 200 of FIG. 2, cause the processor(s) to perform the following steps.

In a scan stage, at step 610, the deduplication estimation engine scans a plurality of fingerprints of a dataset. Each fingerprint uniquely identifies one of a plurality of data blocks of the dataset; however, as discussed above, an insignificant percentage of the distinct data blocks may have the same fingerprint. To get an accurate estimate all (or most) of the block fingerprints associated with the dataset need to be scanned. As discussed above, scanning all of the fingerprints can result in a large overhead, and thus, the scanning of the fingerprints must be efficient.

The scanning operation can be performed using a 32-bit RAID checksum of the data block for the fingerprint. This scanning methodology can be any efficient scanning methodology. For example, the scanning methodology can make use of an on-disk layout that stores data blocks as well as the associated checksums, and proposes an efficient way to read only the checksum blocks from disk. Advantageously, the checksums are stored separately (e.g., in other blocks). The above referenced application also proposes using certain file system block mapping metadata to determine the live blocks in a dataset or storage container. Accordingly, this technique could be used for on-demand scanning of fingerprints from disk when an estimation request is received.

An alternative approach to the scanning step described above is to proactively maintain a content-based sample of the fingerprints during I/O operations (i.e., during data block reads and/or writes). In this context, proactively maintaining the content-based sample of fingerprints means maintaining the sample during normal operation (e.g., during block reads and/or writes) of the storage system.

The proactive scanning and/or maintaining of the content-based sample can be performed in real-time (or near real-time) and/or periodically. For example, block changes and/or updates to the dataset may be batched and used to periodically update the content-based sample. In one embodiment, the batched changes and/or updates can come in the form of a changed log file that is generated by another operation or function such as a data deduplication engine. For example, the data blocks that are written to disk during a CP write to disk are in a changed log file. This changed file log can be scanned periodically (i.e., when it is written to disk). This scanning approach is discussed in greater detail with respect to FIGS. 9-11.

In a selection stage, at step 612, the deduplication estimation engine selects a subset of the plurality of fingerprints based on content of the fingerprints resulting in a content-based sample. In an estimation stage, at step 614, the deduplication estimation engine estimates a number of distinct data blocks in the dataset using the content-based sample.

Figure 7:
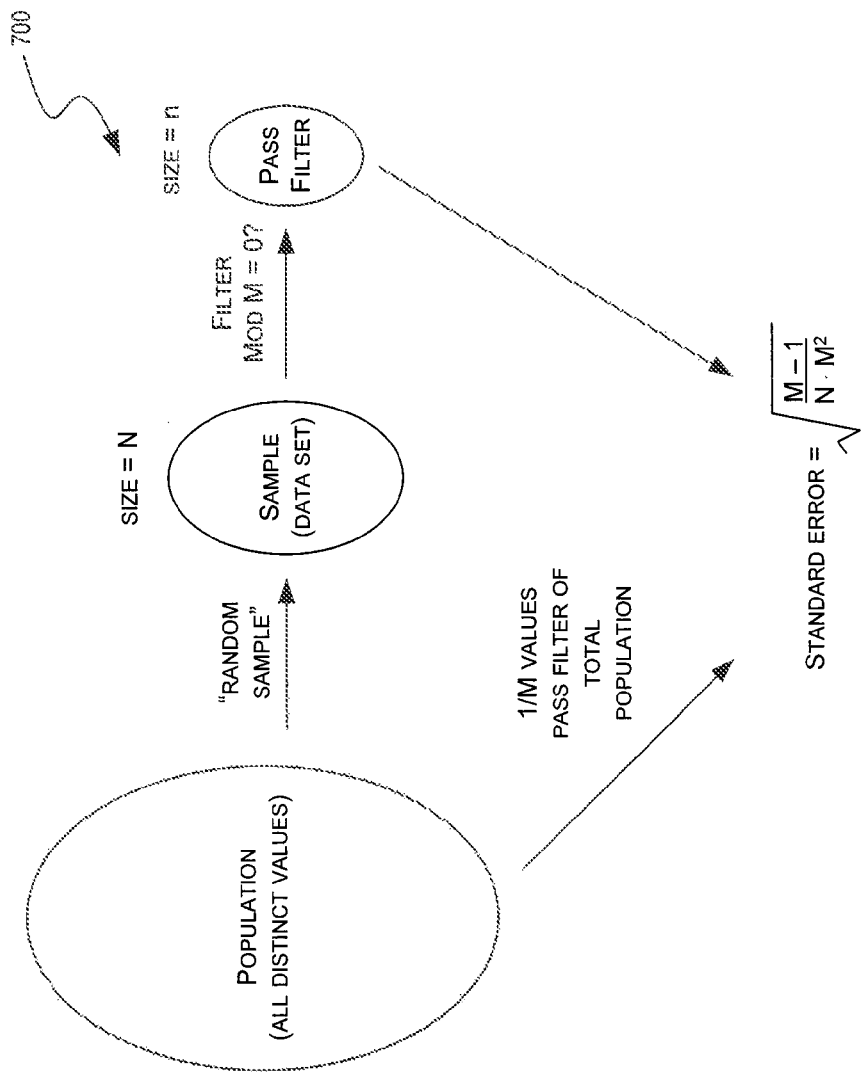
FIG. 7 shows an example illustrating the concept behind the scheme for performing content-based sampling in order to estimate the number of distinct data blocks in a dataset.

FIG. 7 shows an example illustrating the conceptual scheme 700 for performing content-based sampling in order to estimate the number of distinct data blocks in a dataset, according to an embodiment. More specifically, the conceptual scheme 700 illustrates the idea behind the data deduplication estimation described herein through the use of a "polling" example.

For example, if all possible fingerprint values are considered as the population for a poll, then the distinct fingerprints of the data in the storage container (referred as "dataset") consist of a random sample of the population. In this example, the question of the poll is whether the fingerprint passes the "Mod M" filter. If the fingerprint algorithm has good uniform randomness, the percentage of fingerprints that pass the "Mod M" filter (i.e., say "Yes" to the filter) is $p=1/M$ in the population.

The number of distinct fingerprints in data set is defined as $N\_u$. The number of fingerprints in data set and passing the filter is defined as $n\_u$. The content-based sampling technique described herein determines the actual percentage ($r=n\_u/N\_u$) of fingerprints saying "Yes" in the data set. According to the theorem behind the margin of error (the theory behind polling), if the dataset is a random sample of the population, r is an unbiased estimation of p. The standard deviation of r for this random sample is $\sqrt{(p \cdot (1-p)/N\_u)}$, from which the standard deviation of the error can be derived. The standard deviation of the error is $\sqrt{((M-1)/N\_u)}$. However, the error can be approximated as a normal distribution with zero mean and standard deviation $\sqrt{((M-1)/N\_u)}$. Thus, when $N\_u$ is significantly greater than M, $N\_u/(M-1) \approx n\_u$. Therefore, in practice, the system needs to maintain a fixed number of distinct fingerprints in the sample (i.e., $n\_u$), in order to achieve an appropriate error distribution.

The desired number of distinct values in sample can be calculated based on the required level of accuracy. The error of the estimation is defined as error=(Estimation−True Value)/True Value. Thus, the error is a value between 0 and 1. The smaller the error, the better the accuracy. Given the estimation scheme, the system can specify a required level of accuracy as follows: the probability that the estimation error is greater than y and is less than x. Given such a requirement, the desired number of distinct values in sample (denoted as n) can be calculated as follows:

1. Find the value a such that $erf(a)=1-x/100$, where erf is a known "error" function commonly used in probability and statistics. There are well known techniques for computing the inverse of the error function, so this is straightforward: $a=erf^{-1}(1-x/100)$ 2. Once a is known, n is calculated as $n=2a^2/y^2$.

Finally, the number of distinct blocks in the storage container is estimated to be the number of distinct fingerprints in the sample multiplied by M, because it is statistically expected that only 1/M distinct fingerprint values were selected for the sample. The estimate of the distinct block ratio is then computed from the estimated number of distinct blocks divided by the total number of blocks.

In some primary storage system the size of the data block could be variable in size. In this case, the estimation is slightly modified to handle blocks with variable size. For example, to sample the fingerprint of variable-size block, the sampling algorithm records the fingerprint and the size of the block in the sample. Additionally, rather that estimating the total number of distinct blocks in the data set, an estimate of the total size of distinct blocks is estimated by multiplying the total size of distinct blocks in the sample with M.

II. Adaptive Filtering Mechanisms

Figure 8:
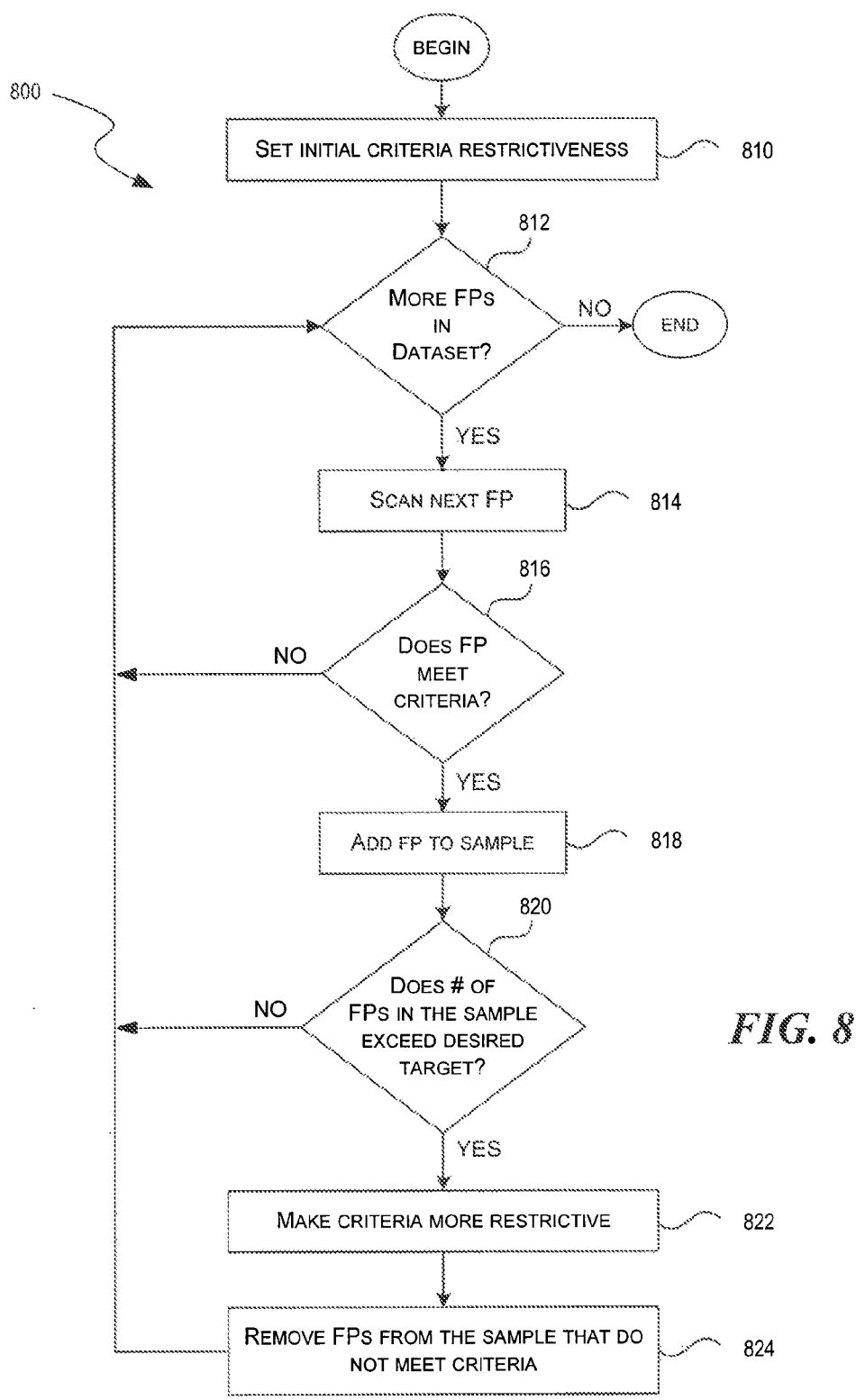
FIG. 8 is a flow diagram illustrating an example process for estimating the number of distinct data blocks in a dataset using an adaptive sampling configuration.

FIG. 8 is a flow diagram illustrating an example process 800 for estimating the number of distinct data blocks in a dataset using an adaptive sampling configuration, according to an embodiment. A deduplication estimation engine such as, for example, data deduplication engine 224 of FIG. 2, among other functions, determines an estimate of the number of distinct data blocks in a dataset.

As discussed above, in most cases, the accuracy of the data deduplication estimation depends only on the number of distinct data blocks in the sample, not the size of the container or the percentage of the container that is sampled. However, in the content-based sampling described herein, it is not possible to determine, at the start of the scan, the number of distinct data blocks that will be in the sample at the end of the scan, given a particular fixed predicate on the values. Accordingly, the adaptive sampling technique described herein provides for gradually increasing the restrictiveness of the sampling condition. For example, as the desired sample size is exceeded, fewer distinct data blocks are sampled. Additionally, a formula that defines how many distinct data blocks are needed for a particular accuracy level is defined. This allows the data deduplication estimation engine to determine when it has more than enough distinct block values during the course of content-based sampling. If the data deduplication estimation engine has more samples than needed, a more restrictive condition to reduce the sample size can be applied to the remaining fingerprints to be scanned as well as those fingerprints that have already been scanned and added to the sample FPDB.

The deduplication estimation engine may be embodied as hardware and/or software, including combinations and/or variation thereof. In addition, in some embodiments, the deduplication estimation engine includes instructions stored thereon, wherein the instructions, when executed by one or more processors of a data processing system or storage controller such as storage controller 200 of FIG. 2, cause the processor(s) to perform the following steps.

In a configuration stage, at step 810, the deduplication estimation engine sets an initial restrictiveness on the sampling condition or filter criteria. In one embodiment, the initial restrictiveness is set such that all fingerprints pass the filter. However, any initial restrictiveness can be used.

In a determination stage, at step 812, the deduplication estimation engine determines whether or not more fingerprints exist in the dataset that need to be scanned. If all of the fingerprints have been scanned, then the process can end. However, if additional fingerprints exist in the dataset that need to be scanned then, in a scan stage, at step 814, the deduplication estimation engine selects and scans the next fingerprint.

In a determination stage, at step 816, the deduplication estimation engine applies the sampling condition to the fingerprint and determines whether the fingerprint meets the sampling criteria. If the fingerprint does not meet the sampling criteria, then the process returns to step 812. However, if the fingerprint meets the sampling condition then, in a selection stage, at step 818, the deduplication estimation engine adds fingerprint to the content-based sample of fingerprints.

In a determination stage, at step 820, the deduplication estimation engine determines whether the number of fingerprints in the content-based sample of fingerprints meet or exceed a desired target. The desired target is a factor of the number of fingerprints that are needed to give the desired accuracy. In one embodiment, the number of fingerprints must meet or exceed the number of fingerprints that are needed to give the desired accuracy by, for example, a factor of two. If the number of fingerprints in the content-based sample does not meet or exceed the desired target, then the process returns to step 812. However, if the number of fingerprints in the content-based sample does meet or exceed the desired target, then in a configuration stage, at step 822, the deduplication estimation engine makes the criteria more restrictive.

In a reduction stage, at step 824, the deduplication estimation engine removes any fingerprints from the sample that no longer meet the more restrictive sampling condition. For example, if an initial restrictiveness is set for a sampling condition as follows ($f \mod M$)=0), with initial M set to the value "1," then the value of M (the initial restrictiveness) can be increased to 2 if the number of fingerprints in the content-based sample of fingerprints meet or exceed the desired target. In some embodiments, the desired target can increase as the restrictiveness increases to ensure that the content-based sample includes as few fingerprints as possible but at least the number of fingerprints that are needed to give the desired accuracy. After the reduction stage, the process returns to step 812.

III. Efficient Scanning of Fingerprints

This estimation techniques described herein can only be applied to a primary storage system if there is an efficient way to scan the fingerprints. There are several ways in which the fingerprints can be efficiently scanned. These techniques will be discussed in greater detail below.

Figure 9:
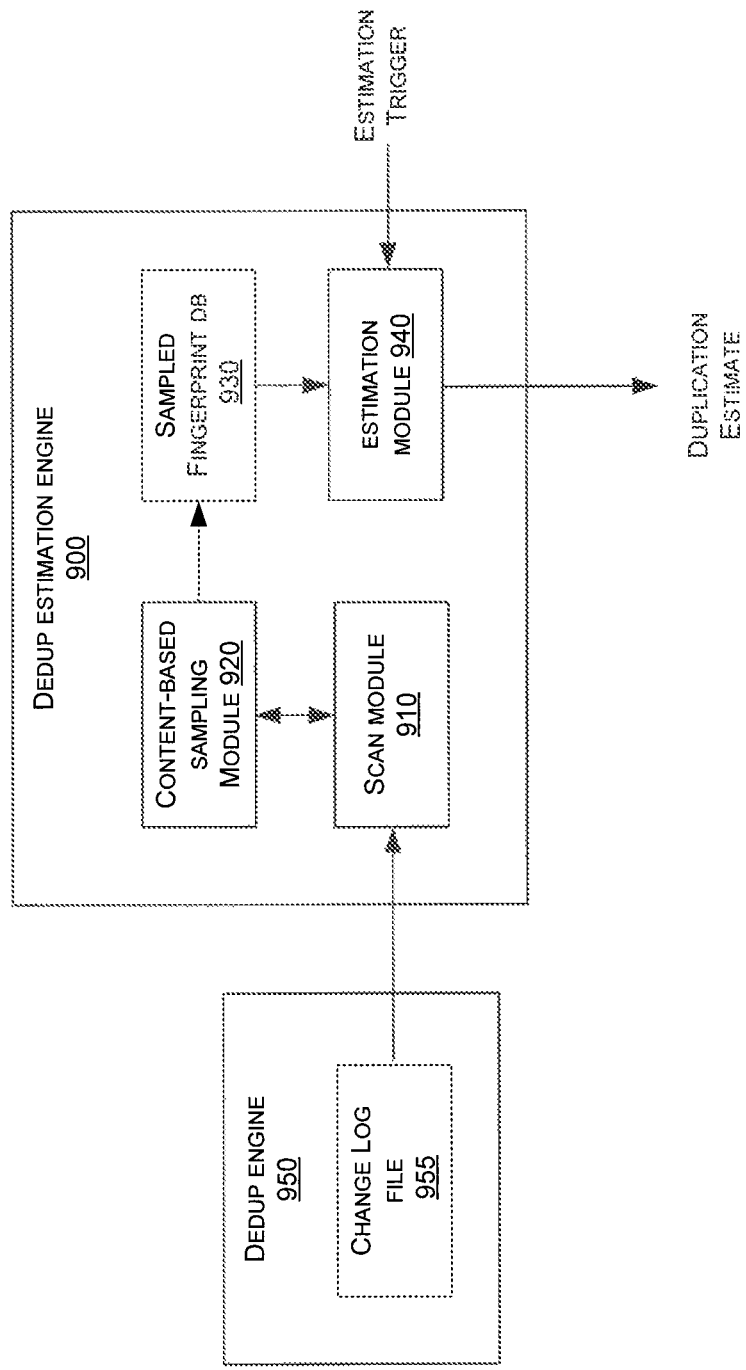
FIG. 9 shows an example block diagram illustrating the components of a data deduplication estimation engine.

FIG. 9 shows an example block diagram illustrating the components of a data deduplication estimation engine 900 for performing proactive scanning, according to an embodiment. The example of FIG. 9 is similar to the example of FIG. 5; however, FIG. 9 further illustrates the ability of the scan module 910 to reuse and/or otherwise utilize a change log file that is generated by a data deduplication engine 950. The data deduplication estimation engine 900 and the data deduplication engine 950 may be, for example, the data deduplication estimation engine 224 and the data deduplication engine 226 of FIG. 2, respectively, although alternative configurations are possible.

Figure 10:
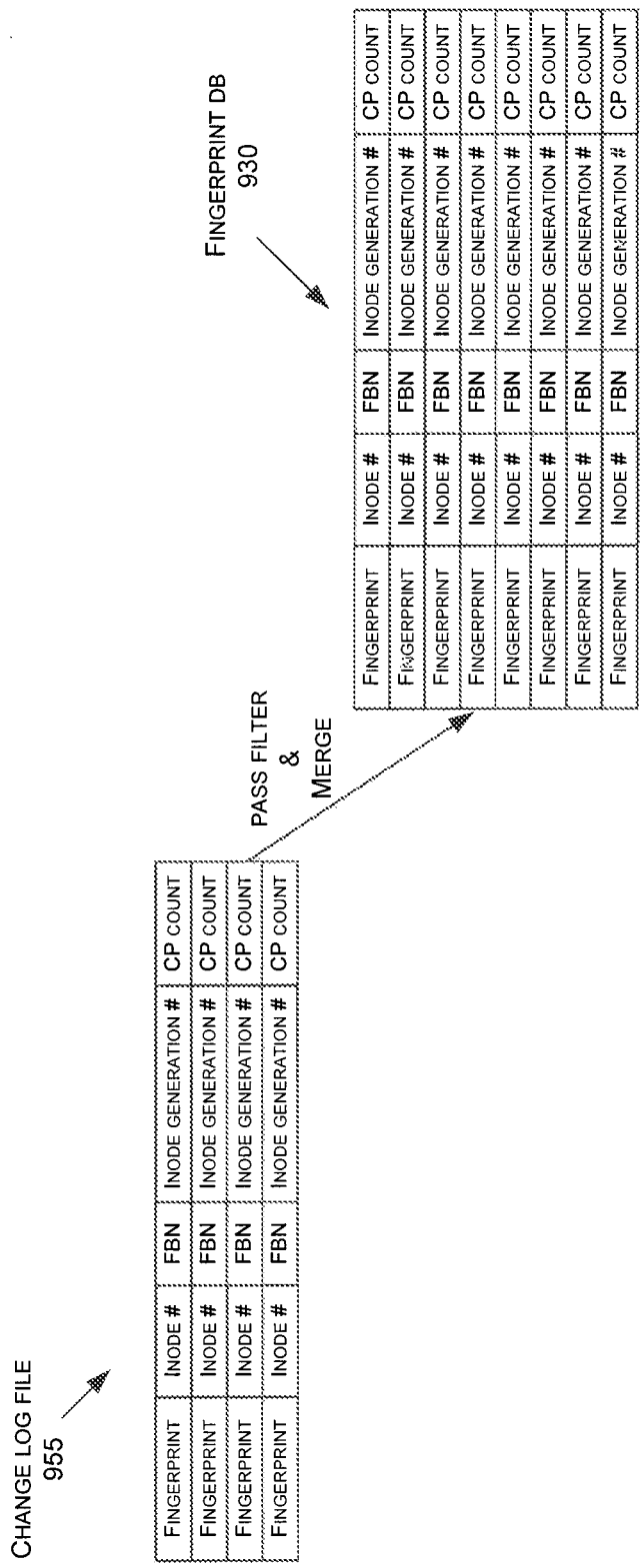
FIG. 10 illustrates an example diagram illustrating the merging of a change log file into a sampled fingerprint database file.

The example of FIG. 9 illustrates a scan module 910 periodically scanning a change log file 955 that is generated using the data deduplication engine 950. With the data deduplication engine 950, the information related to the data blocks written to disk at each CP is recorded in a change log file 955. The change log file 955 can be merged into the sampled FPDB 930 by the content-based sampling module 920 if the entries pass the sampling condition or filter as shown in FIG. 10.

In one embodiment, a fingerprint value can be a concatenation of a checksum followed by additional information. For example, in one embodiment a 64-bit fingerprint of a data block is a concatenation of the data block's 32-bit RAID checksum followed by 4 bytes data from a fixed offset of the data block. The information stored in the fingerprint database and the change log files for each block can be a tuple of {fingerprint, inode number, file block number (FBN), inode generation number, CP count}.

A fingerprint is fixed-length, pseudorandom sequence of bits that is a product of a hash function such as, for example, hash function 425 of FIG. 4.

The inode number identifies the file. An inode is a metadata container used to store metadata about a file, such as ownership of the file, access permissions for the file, file size, file type, and pointers to the highest-level of indirect blocks for the file. An inode is typically stored in a dedicated inode file. The inode is the starting point for finding the location of all of the associated data blocks of a file. The inode generation number identifies the inode relative to other inodes.

The storage operating system maintains a logical block number for each data block. The logical block numbers are called file block numbers (FBNs). Each FBN indicates the logical position of the block within a file, relative to other blocks in the file, i.e., the offset of the block within the file. Note that the term "file" as used herein can mean any named logical container of data that can be composed of one or more smaller identifiable units of data, such as data blocks. For example, FBN 0 represents the first logical block in a file, FBN 1 represents the second logical block in a file, FBN n−1 represents the nth logical block in a file, etc.

The CP count (or consistency point count) is an indicator that identifies a CP relative to other CPs in a series of CPs. A CP is an event in which new or modified data that have been temporarily buffered in a storage server are committed to persistent storage. For example, in one embodiment, the data deduplication engine generates a change log file that indicates which data blocks have been written or removed since the last (CP).

FIG. 10 illustrates the tuple with respect to both the change log file 955 and sampled FPDB 930. It is appreciated that the checksum and/or the additional information may be any number of bits, together and/or separately, that provide for unique identification of data blocks. Additionally, in some embodiments some or all of the {fingerprint, inode number, FBN, inode generation number, CP count}, may not be present or additional information may be included.

In one embodiment, the sampled fingerprint database is maintained as a flat file and sorted by fingerprint. For example, an algorithm can be provided to remove stale blocks from the fingerprint database when the size of the database grows beyond certain threshold. The stale block removal is critical to the sampling technique, since it prevents the deleted blocks from being counted in the sample.

FIG. 10 illustrates the merging of a change log file 955 into the sampled FPBD 930 of FIG. 9. As shown, only one entry of the change log file passes the sampling condition and is merged or added into the sampled FPDB 930. It is appreciated that for each change log file 955, any number of entries may be merged into the sampled FPDB 930. Merging an entry (i.e., fingerprint) into the sampled FPDB 930 may involve adding the entry to the sampled FPDB 930, deleting the entry from the FPDB 930, or replacing an entry in the sampled FPDB 930. In one or more embodiments, entry deletion and/or replacement is performed by a stale block checking process described below.

Figure 11:
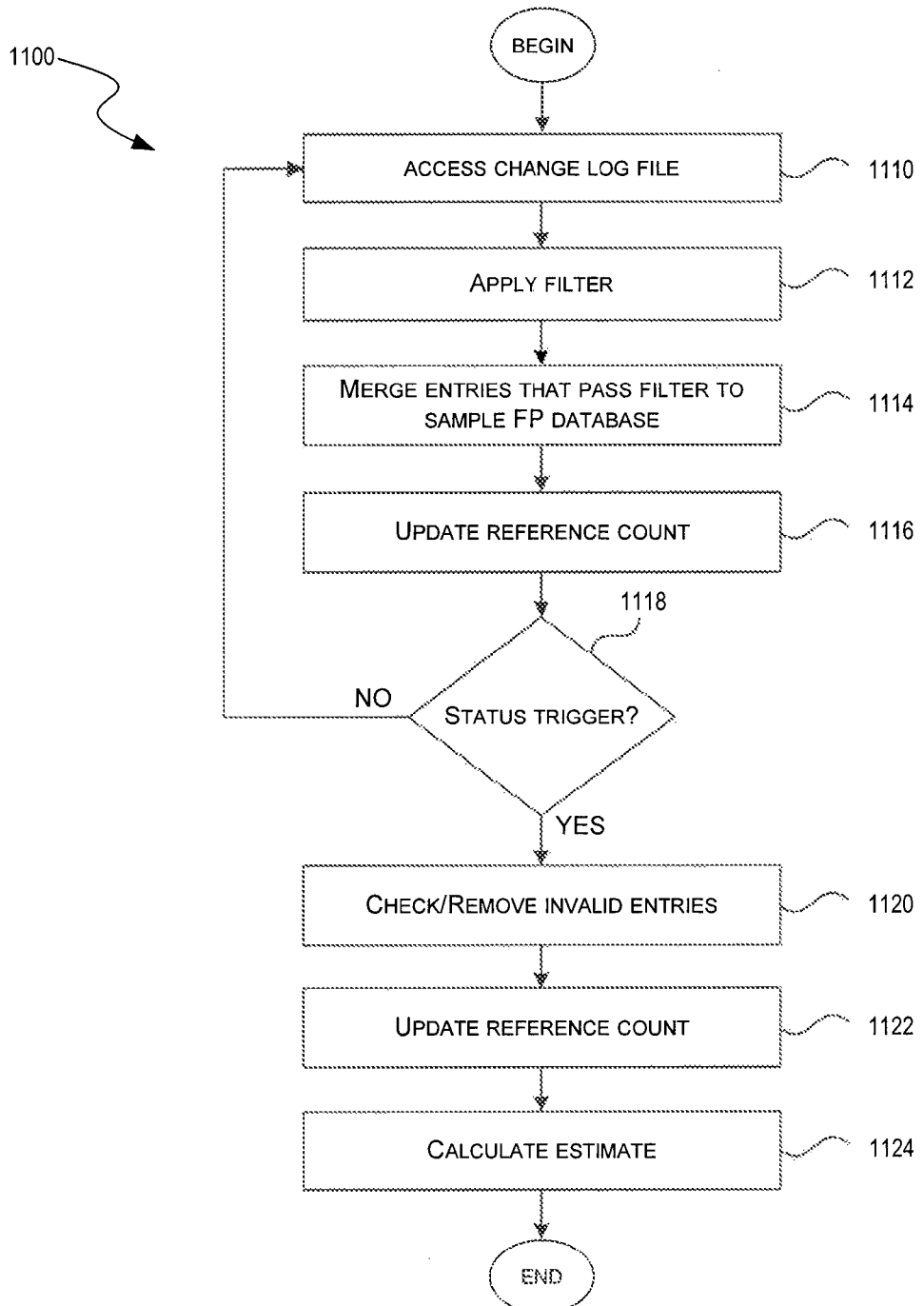
FIG. 11 is a flow diagram illustrating an example process for proactively sampling fingerprints to maintain a selected fingerprint database which used to estimate the number of distinct data blocks in a dataset.

FIG. 11 is a flow diagram illustrating an example process 1100 for proactively sampling fingerprints to maintain a selected fingerprint database which used to estimate the number of distinct data blocks in a dataset, according to an embodiment. A deduplication estimation engine such as, for example, data deduplication engine 224 of FIG. 2 or deduplication engine 900 of FIG. 9, among other functions, maintains the sampled FPDB and determines an estimate of the number of distinct data blocks in a dataset.

The deduplication estimation engine may be embodied as hardware and/or software, including combinations and/or variation thereof. In addition, in some embodiments, the deduplication estimation engine includes instructions stored thereon, wherein the instructions, when executed by one or more processors of a data processing system or storage controller such as storage controller 200 of FIG. 2, cause the processor(s) to perform the following steps.

In an access stage, at step 1110, the deduplication estimation engine accesses, receives, and/or otherwise acquires a change log file for a given CP. For example, the change-logging algorithm can be used to log new or modified data blocks in a change log file. The change log file can be sampled by the sample module.

In a filter stage, at step 1112, the deduplication estimation engine applies a filter or sample condition to a fingerprint of the new or modified data blocks in the change log file. The filter or sampling condition can be a mod M filter or sampling condition as described in greater detail with respect to FIG. 4. Once the filter is applied, only the fingerprints satisfying the sampling condition are logged for that CP. In one embodiment, a sampled change log is kept to log the fingerprints that pass the filter.

In a database update stage, at step 1114, the deduplication estimation engine merges (e.g., adds, updates, and/or deletes) entries that pass the filter (i.e., fingerprints in the sampled change log) into the sampled FPDB. The sampled FPDB can be a metadata file. In one embodiment, both the sampled change log and sampled FPDB have the same tuple format as the original change log and a fingerprint database both of which are maintained a data deduplication engine such as, for example, data deduplication engine 950. All blocks recorded in the sampled fingerprint database satisfy the sampling condition.

The sampled fingerprint database 930 can be a flat file sorted by fingerprint, for example. As discussed, the sampled change log files are merged with the sampled fingerprint database 903. After the merging, the sampled fingerprint database 930 can be sorted in order of (or by) fingerprint. In an update stage, at step 116, the deduplication estimation engine updates the reference count. The reference count can indicate, among other things, the number of distinct fingerprint in the sampled FPDB.

In a determination stage, at step 1118, the deduplication estimation engine determines whether a status trigger is received. In one embodiment, a status trigger can be predicated on a request to calculate a data deduplication estimate and/or the size of the sampled fingerprint database exceeding a certain threshold. If the size of the sampled fingerprint database exceeds certain threshold or an estimation request is triggered then, at step 1120, the deduplication estimation engine checks for and/or removes invalid entries from the sampled FPDB. That is, the deduplication estimation engine needs to determine whether the blocks in the sampled fingerprint database are still in the active file system.

A stale block checking process is now described. To determine whether the blocks in the sampled fingerprint database are still in the active file system, the deduplication estimation engine first check if the inode generation number of the block in the fingerprint database is equal to the real generation number of the inode. An inode is a metadata container used to store metadata about a file, such as ownership of the file, access permissions for the file, file size, file type, and pointers to the highest-level of indirect blocks for the file. An inode is typically stored in a dedicated inode file. The inode is the starting point for finding the location of all of the associated data blocks of a file. The deduplication estimation engine then compares the recorded fingerprint with the real fingerprint read from the data block. If the data block is not in the active file system, then the record of the data block is removed from the fingerprint database.

In an update stage, at step 1122, the deduplication estimation engine updates the reference count if any of the data blocks are found to no longer be active in the file system. For example, after removing any invalid entries from the sampled FPDB, the number of distinct fingerprints in the sampled fingerprint database is updated.

Lastly, in an estimation stage, at step 1124, the deduplication estimation engine calculates an estimate of the number of distinct data blocks in the dataset using the number of distinct fingerprints in the sampled fingerprint database by multiplying the number of distinct fingerprints in the sampled fingerprint database by the integer M.

Typically, for the proactive sampling to generate and/or calculate an accurate prediction, the proactive sampling functionality has to be turned on and/or otherwise activated at the creation of a dataset (or volume) so that the deduplication estimation engine sees all of the data block I/O (e.g., additions, modifications, and/or deletions) of data to the volume. However, in one embodiment it is possible to apply the proactive sampling as a patch to an existing dataset (or volume). For example the following steps could be performed to apply the proactive sampling as a patch:

Step 1) Scan the dataset (or volume) and write the results to a fingerprint database file (FD1).

Step 2) Turn on proactive scanning. Concurrently turn on the proactive sampling functionality for the same dataset (or volume) with an initially empty sampled fingerprint database (FD2). FD2 is populated by the proactive sampling.

Step 3) Apply the filter or sampling condition to FD1. When the process in step 1) stops, remove the entries in FD1 with data block fingerprints that do not satisfy the sampling condition.

Step 4) Merge databases. Merge FD1 into FD2 using the same algorithm that merges a change log file into a fingerprint database.

Step 5) Continue. Keep the proactive sampling functionality running for the life of this dataset (or volume).

In one embodiment, the scanning and maintenance of the sampled FPDB can be conducted inline. In this case, the sampled FPBD is kept in memory and updated with newly written blocks that pass the filer in each CP. The sampled FPDB should also be updated with block deletions. In this case, the sampled FPDB can be indexed by both the fingerprint and a block address. Additionally, a reference counter is maintained for each distinct fingerprint recorded in the sampled FPDB. Thus, for a newly written data block, if its fingerprint satisfies the sampling condition, then the fingerprint is added into the database and the reference counter of that fingerprint increment by 1. If the address of a newly written block is found in the database, the reference counter of the fingerprint in that address is decrement by 1. This is because the block with that fingerprint is overwritten. Accordingly, when the number of blocks in the database exceeds certain threshold or an estimation request is triggered, the inode generation number of any block in the database is compared with the real generation number of the inode, to see whether the file is deleted. If the file is deleted, the corresponding blocks are removed from the database. The fingerprint index and block address index are updated. The number of distinct blocks is also updated.

In some embodiments, the proactive and inline algorithm can work together with the adaptive sampling algorithm.

IV. Deduplication Estimation with Multiple Datasets

Figure 12:
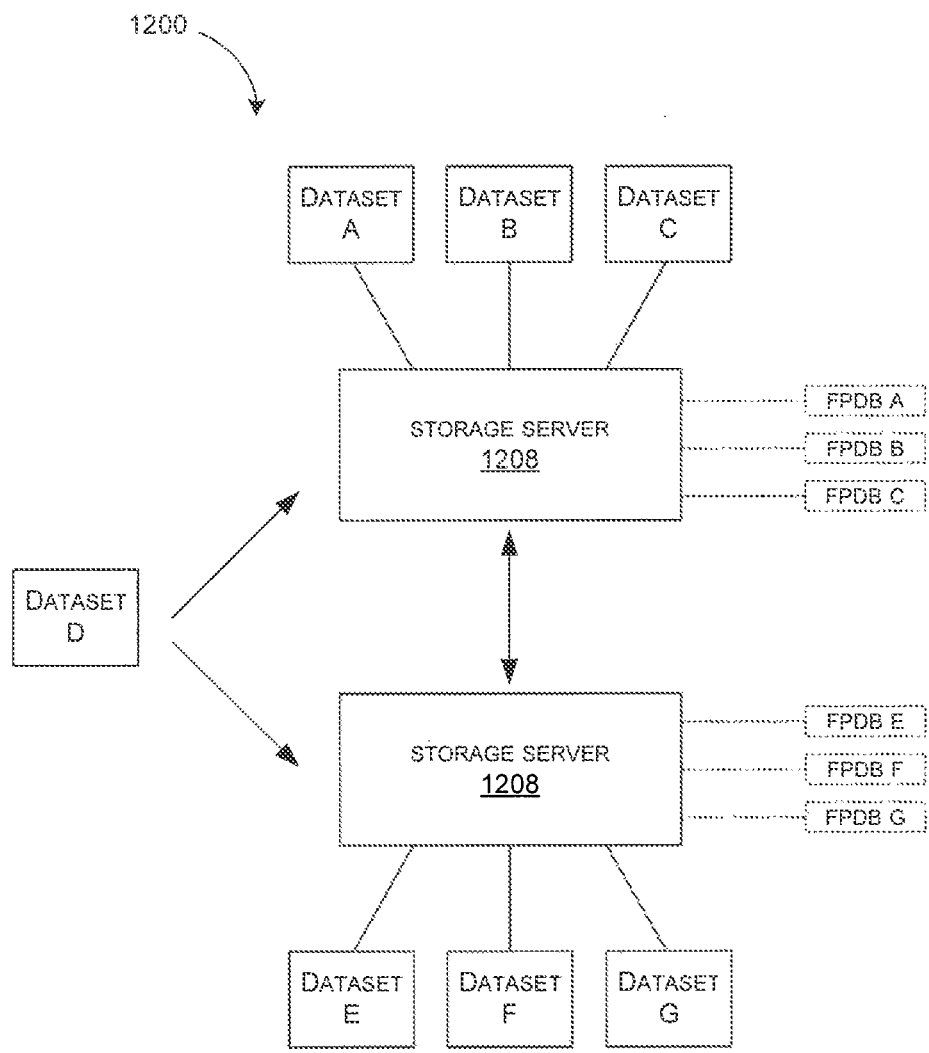
FIG. 12 shows an example network storage system in which the techniques introduced herein can be implemented for estimating the benefit of deduplicating two or more datasets together.

FIG. 12 shows an example network storage system 1200 (or configuration) in which the techniques introduced herein can be implemented for estimating the benefit of deduplicating two or datasets (or storage containers) together. The network configuration described with respect to FIG. 12 is for illustration of one type of configuration in which the techniques can be implemented; other network storage configurations and/or schemes could be used for implementing the techniques introduced herein.

As shown in the example of FIG. 12, the network storage system 1200 includes a plurality of datasets A-G 104 and multiple storage servers 1208. The storage servers 1208 can be the storage server 108 of FIG. 1 although alternative configurations are possible. Although not shown for simplicity, the storage servers 1208 can be coupled with a number of mass storage devices (or storage containers), such as disks, in a mass storage subsystem. Alternatively or additionally, some or all of the mass storage devices can be other types of storage, such as flash memory, solid-state drives (SSDs), tape storage, etc. However, for ease of description, the storage devices are assumed to be disks herein. Each of the plurality of datasets A-G can be stored on one or more of the storage servers 108.

The processes described herein are organized as sequences of operations in the flowcharts. However, it should be understood that at least some of the operations associated with these processes potentially can be reordered, supplemented, or substituted for, while still performing the same overall technique.

The techniques introduced above can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of estimating a number of distinct data blocks in a dataset for data deduplication prior to performing a data deduplication process on the dataset, the method comprising:
scanning, by a data processing system, multiple fingerprints associated with a dataset, wherein the dataset has been chunked into multiple data blocks, and wherein each of the multiple fingerprints is associated with one of the multiple data blocks;
selecting, by the data processing system, a subset of the multiple fingerprints in accordance with a sampling condition specifying a subset of all possible fingerprint values to produce a content-based sample of fingerprints; and
determining, by the data processing system, an estimated number of distinct data blocks in the dataset by determining a number of distinct fingerprints in the content-based sample of fingerprints, wherein the estimated number of distinct data blocks in the dataset is determined prior to performing a data deduplication process on the dataset.

2. The method of claim 1, wherein selecting the subset of the multiple fingerprints is performed such that a probability of an individual fingerprint being selected is independent of a number of times that the individual fingerprint occurs in the multiple fingerprints.

3. The method of claim 1, further comprising:
determining, by the data processing system, a distinct block ratio for the dataset; and
estimating, by the data processing system, an effectiveness of the data deduplication process on the dataset by using the distinct block ratio for the dataset.

4. The method of claim 3, wherein determining the distinct block ratio comprises:
identifying a total number of data blocks in the dataset; and
dividing the estimated number of distinct data blocks in the dataset by the total number of data blocks in the dataset.

5. The method of claim 1, wherein selecting the subset of the multiple fingerprints comprises:
filtering the multiple fingerprints in accordance with the sampling condition; and
selecting the subset of the multiple fingerprints that meet the sampling condition.

6. The method of claim 5, further comprising:
increasing a restrictiveness of the sampling condition from an initial restrictiveness to an increased restrictiveness when a number of fingerprints in the content-based sample of fingerprints exceeds a threshold value.

7. The method of claim 6, further comprising:
filtering the content-based sample of fingerprints in accordance with the sampling condition with the increased restrictiveness; and
removing fingerprints that do not meet the sampling condition with the increased restrictiveness from the content-based sample of fingerprints.

8. The method of claim 1, further comprising:
varying a restrictiveness of the sampling condition to control an accuracy of the estimated number of distinct data blocks.

9. The method of claim 5, wherein the sampling condition comprises a function $(f \bmod M)=0$, where $f$ is a fingerprint integer value, M is an integer, and $M \geq 1$.

10. The method of claim 9, wherein the estimated number of distinct data blocks in the dataset is determined by multiplying the number of distinct fingerprints in the content-based sample of fingerprints by M.

11. The method of claim 1, wherein the sampling condition comprises a function $(f \bmod M)=n$, where $f$ is a fingerprint integer value, n and M are integers, and $0 \leq n < M$.

12. The method of claim 1, further comprising:
monitoring, by the data processing system, data block input/output (I/O) operations associated with the dataset; and
maintaining, by the data processing system, a database including the multiple fingerprints during data block input/output (I/O) operations.

13. The method of claim 1, wherein scanning the multiple fingerprints associated with the dataset comprises:
reading the multiple fingerprints and not the multiple data blocks from a storage container.

14. The method of claim 1, wherein scanning the multiple fingerprints associated with the dataset comprises:
scanning the multiple fingerprints in a change log file, wherein the change log file indicates new or modified data blocks in the dataset with respect to a consistency point, and wherein each of the multiple fingerprints is associated with one of the new or modified data blocks.

15. The method of claim 1, further comprising:
accessing, by the data processing system, a second content-based sample of fingerprints including a subset of multiple fingerprints associated with a second dataset; and
determining, by the data processing system, an estimated number of data blocks in common between the dataset and the second dataset by determining a number of fingerprints in common between the content-based sample of fingerprints and the second content-based sample of fingerprints.

16. A method of estimating an effectiveness of a data deduplication process on a dataset prior to performing the process, the method comprising:
scanning, by a data processing system, multiple fingerprints associated with a dataset in a change log file, wherein the change log file indicates new or modified data blocks in the dataset with respect to a consistency point, and wherein each of the multiple fingerprints is associated with one of the new or modified data blocks;
selecting, by the data processing system, a subset of the multiple fingerprints in the change log file based on fingerprint content;
merging, by the data processing system, the selected subset of the multiple fingerprints into a selected fingerprint database;
identifying, by the data processing system, invalid fingerprints in the selected fingerprint database in response to a status trigger;
removing, by the data processing system, the invalid fingerprints from the selected fingerprint database; and
determining, by the data processing system, an estimated number of distinct data blocks in the dataset by determining a number of distinct fingerprints in the selected fingerprint database, wherein the estimated number of distinct data blocks in the dataset is determined prior to performing a data deduplication process on the dataset; and
estimating an effectiveness of the data deduplication process on the dataset by using the estimated number of distinct data blocks in the dataset.

17. The method of claim 16, further comprising:
maintaining, by the data processing system, a reference count indicating the number of distinct fingerprints in the selected fingerprint database.

18. The method of claim 17, wherein the status trigger indicates that the reference count exceeds a threshold.

19. The method of claim 16, wherein the status trigger indicates an estimation request.

20. The method of claim 16, further comprising:
sorting the selected fingerprint database by fingerprint integer value.

21. The method of claim 16, wherein removing the invalid fingerprints from the selected fingerprint database comprises:
identifying recorded inode generation numbers associated with fingerprints in the selected fingerprint database;
reading actual inode generation numbers associated with the fingerprints; and
comparing the recorded inode generation numbers with the actual inode generation numbers to determine whether the fingerprints are associated with active data blocks.

22. The method of claim 16, wherein selecting the subset of the multiple fingerprints is performed such that a probability of an individual fingerprint being selected is independent of a number of times that the individual fingerprint occurs in the multiple fingerprints.

23. A data processing system comprising:
a data deduplication engine configured to generate a change log file for a dataset, wherein the dataset has been chunked into multiple data blocks, and wherein the change log file indicates new or modified data blocks in the dataset with respect to a consistency point;
a data deduplication estimation engine configured to:
scan multiple fingerprints associated with the dataset in the change log file, wherein each of the multiple fingerprints is associated with one of the new or modified data blocks;
select a subset of the multiple fingerprints in the change log file in accordance with a sampling condition specifying a subset of all possible fingerprint values;
merge the selected subset of the multiple fingerprints into a content-based sample of fingerprints; and
determine an estimated number of distinct data blocks in the dataset by determining a number of distinct fingerprints in the content-based sample of fingerprints, wherein the estimated number of distinct data blocks in the dataset is determined prior to performing a data deduplication process on the dataset.

24. The data processing system of claim 23, wherein the data deduplication estimation engine is configured to select the subset of the multiple fingerprints by:
filtering the multiple fingerprints in accordance with the sampling condition; and
selecting the subset of the multiple fingerprints that meet the specific sampling condition.

25. The data processing system of claim 24, wherein the data deduplication estimation engine is further configured to:
increase a restrictiveness of the sampling condition from an initial restrictiveness to an increased restrictiveness when a number of fingerprints in the content-based sample of fingerprints exceeds a threshold value.

26. The data processing system of claim 25, wherein the data deduplication estimation engine is further configured to:
filter the content-based sample of fingerprints in accordance with the sampling condition with the increased restrictiveness; and
remove fingerprints that do not meet the sampling condition with the increased restrictiveness from the content-based sample of fingerprints.

27. A data storage system comprising:
a processor; and
a memory system having instructions stored thereon, wherein the instructions, when executed by the processor, cause the data storage system to:
scan multiple fingerprints of a dataset, wherein the dataset has been chunked into multiple data blocks, and wherein each of the multiple fingerprints is associated with one of the multiple data blocks;
select a subset of the multiple fingerprints in accordance with a sampling condition specifying a subset of all possible fingerprint values to produce a content-based sample of fingerprints; and
determine an estimated number of distinct data blocks in the dataset by determining a number of distinct fingerprints in the content-based sample of fingerprints, wherein the estimated number of distinct data blocks in the dataset is determined prior to performing a data deduplication process on the dataset.

28. The data storage system of claim 27, wherein the instructions, when executed by the processor, further cause the data storage system to:
access a second content-based sample of fingerprints, the second content-based sample of fingerprints including a subset of multiple fingerprints associated with a second dataset;
access a third content-based sample of fingerprints, the third content-based sample of fingerprints including a subset of multiple fingerprints associated with a third dataset;
determine an estimated number of data blocks in common between the first dataset and the second dataset by determining a number of fingerprints in common between the first content-based sample of fingerprints and the second content-based sample of fingerprints;
determine an estimated number of data blocks in common between the first dataset and the third dataset by determining a number of fingerprints in common between the first content-based sample of fingerprints and the third content-based sample of fingerprints; and
deduplicating the first dataset and the second dataset together when the estimated number of data blocks in common between the first dataset and the second dataset is greater than the estimated number of data blocks in common between the first dataset and the third dataset.

* * * * *